United States Patent Office 3,431,295
Patented Mar. 4, 1969

3,431,295
PROCESS FOR THE PREPARATION OF OPTICALLY ACTIVE LYSINE
Geertrudes H. Suverkropp, Beek, Netherlands, assignor to Stamicarbon N.V., Heerlen, Netherlands
No Drawing. Filed Nov. 12, 1964, Ser. No. 410,762
U.S. Cl. 260—501.11                    10 Claims
Int. Cl. C07b 19/00; C07c 99/12, 101/24

ABSTRACT OF THE DISCLOSURE

There is provided an economically attractive process for resolving racemic mixtures of lysine by using an optical antipode of α-phenoxypropionic acid. Preferably the D-α-phenoxy propionic acid is used and the separation of the formed volts is accomplished by solvent extraction in at least three stages.

---

The present invention relate to a process for the preparation of optically active lysine or derivatives thereof, e.g., lysine monohydrochloride, from a mixture, e.g., a racemate of D(—)- and L(+) lysine, in which process salt formation with an optically active acid is applied.

Industry has been in great need of an economically feasible process for preparing optically active lysine, in particular L(+)-lysine, as a food or feed supplement, from synthetic lysine or comparable products.

Starting from the well-known method of separating optical antipodes of bases by utilizing the difference in solubility of the diastereo-isomeric salts formed with an optically active acid, many experiments have already been carried out and many proposals have been made for the treatment of mixtures of D(—)- and L(+)-lysine with certain optically active acids.

A considerable time ago, for instance, it was suggested that D-camphoric acid could be used for this treatment (Berg, J. Biol. Chem., 115 (1936), pp. 9–15), and more recently optically active acid tartrates have been proposed (German Auslegeschrift 1,118,794).

In all such proposals made so far, one or more of the important requirements for a suitable industrial process, particularly for large scale preparations, are not met at all or are only insufficiently satisfied. These requirements include: good crystallizing properties and sufficiently rapid crystallization of the diastereo-isomeric salt(s), as well as sufficient difference in solubility between these salts; high selectivity in the production of the preferred diastereo-isomer; and non-occurrence of racemization of the optically active acid under the reaction conditions.

It is an object of this invention, accordingly, to provide a new and improved process for the optical resolution of racemic lysine.

The objects of the invention include the provision of new and improved processes of economical and industrial feasibility for the production of L(+)-lysine, such techniques including embodiments in which a particular optically active acid is used to form a salt with the racemic lysine. Further objects of the invention include steps and procedures in combination with the above process for the separation of the desired optical antipode of lysine and the recovery and reuse of the optically active acid.

The invention also includes as a further object the embodiment in which the non-desired antipode is racemized and recycled for further production of the desired antipode.

As a particular object of the invention, a process is provided herein wherein stage-wise extraction of the diastereo-isomeric salts is accomplished with recycling of the filtrated from successive stages to earlier stages as the extractive solvent.

Other objects will be apparent to those skilled in the art from the following description.

According to the invention, it has now been found that technically excellent and economically attractive results can be obtained in the preparation of optically active lysine or a compound thereof from mixtures, e.g., racemates of D(—)- and L(+)-lysine by the application of salt formation with an optically active acid, if the optically active acid used is one of the optical natipodes of α-phenoxy propionic acid. If in carrying out this process use is made of D(+)- α-phenoxy propionic acid, the salt of this acid with L(+)-lysine ("LD-salt") has an essentially lower solubility than the salt formed with D(—)-lysine ("DD-salt"). If use is made of L(—)-α-phenoxy propionic acid, the salt formed with D(—)-lysine ("DL-salt") is inferior as regards solubility to the salt formed with L(+)-lysine ("LL-salt").

In accordance with this invention, the respective differences in solubility of these salts are sufficient to permit a ready separation of the desired antipode of lysine by crystallization of the least soluble salt.

The application of the process according to this invention also includes additional features and variations in the techniques commonly employed in this field. In one embodiment particularly attractive in its tetchnical-economic advantages, the invention includes, for instance: the recovery and recycling of the optically active acid; the separation of the desired optically active lysine from the reaction product, and, if desired, its conversion into another derivative or salt; the racemization of the non-desired optical antipode of lysine, followed by recycing to the system of the resulting racemate for further optical separation.

In the preferred embodiment of the invention, the starting material is converted into a solid salt with essentially an equimolecular amount of acid, which salt is then treated with a solvent to prepare fractions rich in D(—)- and L(+)-lysine, respectively. For instance, conversion of an aqueous solution of the racemate or mixture with D(+)-α-phenoxy pripionic acid, followed by substantial removal of the water, e.g. by evaporation, spray-drying or azeotropic distillation, furnishes a mixture of the LD- and DD-salts. After selective extraction with a solvent, this mixture yields a liquid phase rich in DD-salt and a solid phase rich in LD-salt.

Methanol is preferably utilized as the extractive solvent. In this case, optimum results are achieved when performing the selective extraction at least in part at substantially a temperature of from about 20° C. to about 50° C., preferably substantially about 35° C.

Particularly good results, notably as regards optical purity and yield of the end product, are achieved by the application of counter-current extraction of the salt mixture with the solvent, which is a further feature of the invention. In this embodiment, the salt mixture is extracted several times stage-wise, using as the extractive solvent in first stages the filtrate solution recovered from subsequent stages.

In the practice of these respective stages of extraction, it will be appreciated that those skilled in the art will be able, in any given instance, to determine and select the optimum amount of solvent required for a given weight of salt mixture under the ambient conditions employed. As the following examples illustrate, an optimum amount of extractive solvent in the first stage is in some cases about the same, weight for weight, as the amount of salt mixture, while in other specific systems more than twice as much solvent may be used. If more solvent is employed, there may be a reduction in the yield of the desired lysine antipode. Conversely, if less than optimum quantities of solvent are employed, there may be inadequate dissolution of the undesired lysine antipode and a commensurate decrease in the efficiency of the separation of the racemic mixture. However, subsequent stages may require only smaller amounts of solvent. It is our present experience that the quantity of extractive solvent employed for effective and economic separations will be within the range of from about 160 to 300 percent by weight, preferably 180 to 280 percent by weight, of the racemic salt mixture—depending, of course, in the multistage embodiment, balancing the amount of solvent recycled to earlier stages from subsequent stages.

It is, as indicated, also within the scope of this invention to perform subsequent treatments on the separated salts of the optical antipodes of the lysine.

If L(+)-lysine is the desired product, the solid phase rich in LD-salt may be treated to separate the lysine itself, e.g., by dissolving the solid salt in water and treating the solution with an appropriate ion exchanger. A principal useful technique is to convert the desired LD-salt of lysine and the α-phenoxy propionic acid into another salt form, for instance, the lysine salt of a mineral acid, particularly the hydrochloride salt.

The foregoing techniques and principals of the invention will be further understood by the following illustrative examples which are not to be taken, however, as limiting the scope of the invention to these particular practices.

Example 1

146 grams of DL-lysine and 166 frams of D(+)-α-phenoxy propionic acid are dissolved in 310 grams of water. The resulting liquid was then converted into 312 grams of powdery salt by spray-drying. The resulting powder was then stirred with 312 grams of methanol, first for 30 minutes, at a temperature of 65° C., and subsequently for 60 minutes at a temperature of 35° C.

The solid substance left undissolved is then separated from the warm solution and subsequently stirred, at a temperature of 35° C., in periods of 60 minutes, with separate and successive portions of 187 and 250 grams of methanol, respectively. The solid substance left undissolved after the last treatment is then separated from the warm solution by filtration and washed on the filter with 62 grams of methanol of 35° C. The resulting solid salt consists of 115 grams of LD-salt (yield 74% with respect to the L(+)-lysine in the starting product). Dissolution of this salt in 120 grams of water and stripping of the adhering methanol, followed by conversion with hydrochloric acid with simultaneous extraction of the D(+)-α-phenoxy propionic acid with toluene yields 67.0 grams of L(+)-lysine HCl with a specific rotation $[\alpha]_D^{20} = +25.1$ (C=10; 6 N HCl), which corresponds to an optical purity of 96.5%. The D(+)-α-phenoxy propionic acid thus released in this step is ready for re-use. The salt recovered from the extraction solutions is split into its components, e.g., by means of an ion exchanger, after which the D(+)-α-phenoxy propionic acid is again available and the lysine mainly, D(−)-lysine, after racemization, e.g., by means of treatment with hydrochloric acid, may be recycled for treatment again in the way indicated above.

Example 2

Successive portions of 312 grams each of the dry powdery lysine salt, prepared as indicated in the preamble of Example 1, may be subjected to selective countercurrent extraction with methanol in the following way. Each portion is subjected to three subsequent extractions. In the first and second extractions, the treatment is with a methanol solution already containing dissolved salts of lysine and D(+)-α-phenoxy propionic acid and which has been recycled from the second and third extractions, respectively. The third extraction treatment is with pure methanol. All extraction treatments are preformed at a temperature of 35° C. with stirring.

From the first extraction stage, the filtrate contains a mixture of LD- and DD-salts, but poor in LD-salt. The D(+)-α-phenoxy propionic acid may be and preferably should be reclaimed from this solution. The lysine which is recovered is then recirculated after racemization.

The solid salt from the first stage is then delivered to the second stage where it is treated with the filtrate cycled from the third extraction stage, in the same manner. The filtrate from the second extraction treatment is delivered to a first storage vessel, hereinafter called vessel A, for recycle to the said first stage. The solid salt from the second stage extraction is delivered to the third extraction stage. Here it is extracted with fresh pure methanol, and the filtrate of this third treatment is then delivered in a second storage vessel, hereinafter called vessel B, for recycle to the said second stage.

The material balance of the process is as follows. A 312 gram portion of the starting product is first stirred with 880 grams of the liquid from vessel A for 35 minutes, after which 952.5 grams of filtrate are separated and treated as hereinbefore indicated. The residue is subsequently stirred with 860 grams of liquid from vessel B during 20 minutes, after which 880 grams of filtrate are separated and dumped in vessel A. The residue is stirred with 812 grams of pure methanol during 10 minutes, after which 860 grams of filtrate are separated and dumped in vessel B. The residue, consisting of 109.1 grams of solid material and 62.4 grams of adhering methanol, is dissolved in water. After removal of the methanol, the solution is acidified with hydrochloric acid and the thus liberated D(+)-α-phenoxy propionic acid is extracted from the solution with toluene. The result is a solution of 63.9 grams of L(+)-lysine HCl (yield 70% with respect to the L(+)-lysine in the starting product), having a specific rotation $[\alpha]_D^{20} = +27.0$ (C=10; 6 N HCl), which corresponds to an optical purity of 99.7%.

It will be understood that the techniques of the foregoing examples may be modified in regard to the quantities of materials, the relative amounts thereof, and the particular temperatures, etc. involved. It is also, of course, within the scope of the invention to use the L(−)-α-phenoxy propionic acid in place of the D form in which case the precipitate at each stage will consist of the DL-salt and the filtrate will contain the desired LL-salt, which may be removed therefrom by concentration and precipatation, or any other desired means.

Other embodiments and modifications of the invention will also occur to those skilled in the art, and the scope of this invention is to be understood to be limited only by the spirit of the following claims.

What is claimed is:

1. A process for the separation of an optical antipode of lysine from a mixture of D(−)- and L(+)-lysine which comprises forming a salt of said mixture in water with an optical antipode of α-phenoxy propionic acid removing the water and thereafter treating said salt with methanol as a solvent to separate the D(−)-lysine salt from the L(+)-lysine salt.

2. The process of claim 1 where D(+)-α-phenoxy propionic acid is used and the L(+)-lysine salt thereof is recovered as a solid undissolved by said solvent, the D(−)-lysine salt going into solution.

3. The process of claim 1 wherein L(−)-α-phenoxy propionic acid is used and the D(−)-lysine salt thereof is recovered as a solid undissolved in said solvent, the L(+)-lysine salt going into solution.

4. The process of claim 1 wherein at least part of said treatment of said salt with said solvent is conducted at a temperature of about 35° C.

5. A process for the optical resolution of a racemic mixture of lysine and for the separation of a salt of L(+)-lysine which comprises forming a salt of said racemic mixture in water with an optical antipode of α-phenoxy propionic acid; removing the water and treating said salt by solvent extraction in a plurality of at least three extraction stages, including using as the extraction solvent in the first of said stages the extraction solution recycled from the second of said stages, using as the extraction solvent in the second of said stages the extraction solution from the third of said stages, and using methanol as the extraction solvent in the third of said stages; delivering the solid salt from said first stage after said extraction to said second stage, and delivering the solid salt from said second extraction stage to said third stage; and recovering an optical antipode of said lysine salt in substantially optical pure form as the solid salt from said third stage.

6. Process of claim 5 wherein the extraction solution obtained from said first stage is treated further for the recovery of said optical antipode of α-phenoxy propionic acid.

7. The process of claim 5 wherein D(+)-α-phenoxy propionic acid is used and the L(+)-lysine salt thereof is recovered as a solid undissolved by said solvent, the D(−)-lysine salt going into solution.

8. The process of claim 5 wherein L(−)-α-phenoxy propionic acid is used and the D(−)-lysine salt thereof is recovered as a solid undissolved in said solvent, the L(+)-lysine salt going into solution.

9. The process of claim 5 wherein said selective extraction with methanol is performed substantially at a temperature of about 35° C.

10. The process of claim 5 wherein lysine in the soluble salt in the extraction solution obtained from said first stage is racemized and recycled for preparation of an additional quantity of said racemic mixture salt.

References Cited

UNITED STATES PATENTS 2,556,907  6/1951  Emmick _____ 260—501

FOREIGN PATENTS 899,023  6/1962  Great Britain.

BERNARD HELFIN, *Primary Examiner.*

M. W. GLYNN, *Assistant Examiner.*

U.S. Cl. X.R.

260—534